United States Patent
Liang

(10) Patent No.: US 11,128,621 B2
(45) Date of Patent: Sep. 21, 2021

(54) METHOD AND APPARATUS FOR ACCESSING WEBSITE

(71) Applicant: Alibaba Group Holding Limited, Grand Cayman (KY)

(72) Inventor: Jie Liang, Guangdong (CN)

(73) Assignee: Alibaba Group Holdings Limited, George Town (KY)

( * ) Notice: Subject to any disclaimer, the term of this patent is extended or adjusted under 35 U.S.C. 154(b) by 0 days.

(21) Appl. No.: 15/934,021

(22) Filed: Mar. 23, 2018

(65) Prior Publication Data

US 2018/0212963 A1    Jul. 26, 2018

Related U.S. Application Data

(62) Division of application No. 14/909,629, filed as application No. PCT/CN2014/081026 on Jun. 27, 2014, now Pat. No. 10,778,680.

(30) Foreign Application Priority Data

Aug. 2, 2013 (CN) .......................... 201310334944.8
Dec. 30, 2013 (CN) .......................... 201310744195.6

(51) Int. Cl.
*H04L 29/06* (2006.01)
*G06F 16/955* (2019.01)
(Continued)

(52) U.S. Cl.
CPC ...... *H04L 63/0876* (2013.01); *G06F 16/9566* (2019.01); *H04L 9/32* (2013.01);
(Continued)

(58) Field of Classification Search
CPC ..... H04L 63/0876; H04L 63/102; H04L 9/32; H04L 67/02; H04L 67/10; H04L 69/04;
(Continued)

(56) References Cited

U.S. PATENT DOCUMENTS 5,796,952 A    8/1998 Davis et al.
5,963,915 A    10/1999 Kirsch
(Continued)

FOREIGN PATENT DOCUMENTS

CN    1578938 A    2/2005
CN    101034981 A    9/2007
(Continued)

OTHER PUBLICATIONS

Radhakrishnan, Sivasankar, Yuchung Cheng, Jerry Chu, Arvind Jain, and Barath Raghavan. "TCP fast open." In Proceedings of the Seventh COnference on emerging Networking EXperiments and Technologies, p. 21. ACM, 2011. (Year: 2011).*
(Continued)

*Primary Examiner* — Luu T Pham
*Assistant Examiner* — Walter J Malinowski
(74) *Attorney, Agent, or Firm* — Alston & Bird LLP

(57) ABSTRACT

A method, apparatus, and computer program product are provided to access a web site. In the context of a method, the method includes acquiring a web address that meets a preset condition, determining a server corresponding to the web address and establishing a transport layer connection therewith. The method further includes upon receiving an instruction for accessing a website corresponding to the web address, using the transport layer connection to send a network request to the server for acquiring the webpage content of the website. Such method can save time for establishing a transport layer connection, thereby improving the efficiency of accessing a web site.

11 Claims, 7 Drawing Sheets

(51) Int. Cl.
*H04L 9/32* (2006.01)
*H04L 29/08* (2006.01)

(52) U.S. Cl.
CPC .......... *H04L 63/102* (2013.01); *H04L 67/02*
(2013.01); *H04L 67/10* (2013.01); *H04L 69/04*
(2013.01)

(58) Field of Classification Search
CPC .......... G06F 17/30887; G06F 16/9566; G06F
16/9574; G06F 21/6245; G06F 21/604;
G06F 2221/2141; G06Q 10/06
USPC ........................................................ 713/168
See application file for complete search history.

(56) References Cited

U.S. PATENT DOCUMENTS

| | | | |
|---|---|---|---|
| 6,006,264 A | 12/1999 | Colby et al. | |
| 6,038,598 A | 3/2000 | Danneels | |
| 6,427,175 B1* | 7/2002 | Khan | H04L 41/22 709/245 |
| 6,463,533 B1* | 10/2002 | Calamera | H04L 29/12009 713/163 |
| 6,523,115 B1 | 2/2003 | Ono et al. | |
| 6,631,360 B1* | 10/2003 | Cook | G06N 20/00 706/20 |
| 6,748,386 B1 | 6/2004 | Li | |
| 6,874,148 B1* | 3/2005 | Richardson | G06F 9/4486 719/328 |
| 6,948,063 B1 | 9/2005 | Ganesan | |
| 6,957,334 B1 | 10/2005 | Goldstein et al. | |
| 6,977,911 B1 | 12/2005 | Geen et al. | |
| 6,993,591 B1* | 1/2006 | Klemm | H04L 67/2847 707/999.002 |
| 7,137,006 B1 | 11/2006 | Grandcolas et al. | |
| 7,318,234 B1 | 1/2008 | Dharmarajan | |
| 7,325,045 B1 | 1/2008 | Manber et al. | |
| 7,333,799 B2* | 2/2008 | Natarajan | H04L 41/0886 455/411 |
| 7,349,975 B2 | 3/2008 | Kikinis | |
| 7,552,338 B1 | 6/2009 | Swildens et al. | |
| 7,590,406 B2 | 9/2009 | Aaltonen et al. | |
| 7,594,189 B1 | 9/2009 | Walker et al. | |
| 7,725,718 B2 | 5/2010 | Langford | |
| 7,865,394 B1 | 1/2011 | Calloway et al. | |
| 7,890,499 B1* | 2/2011 | Boswell | G06F 16/951 707/722 |
| 7,957,525 B2 | 6/2011 | Gentry | |
| 8,131,594 B1 | 3/2012 | Yehoshua et al. | |
| 8,166,135 B2 | 4/2012 | Ganesh et al. | |
| 8,239,926 B1 | 8/2012 | Lin et al. | |
| 8,271,778 B1 | 9/2012 | Zhou et al. | |
| 8,290,146 B2 | 10/2012 | Takashima | |
| 8,364,682 B1 | 1/2013 | Gershony et al. | |
| 8,478,882 B2* | 7/2013 | Iwade | G06F 17/30905 709/227 |
| 8,539,359 B2* | 9/2013 | Rapaport | G06Q 10/10 715/751 |
| 8,799,989 B1* | 8/2014 | Liu | H04L 41/0879 726/1 |
| 8,925,099 B1* | 12/2014 | Saxe | G06F 21/577 726/26 |
| 8,972,376 B1 | 3/2015 | Gailis et al. | |
| 9,262,446 B1* | 2/2016 | Katragadda | G06F 16/20 |
| 9,336,321 B1* | 5/2016 | Hayden | G06F 16/9535 |
| 9,658,738 B1* | 5/2017 | Park | G06F 3/04817 |
| 2001/0052003 A1 | 12/2001 | Seki et al. | |
| 2002/0019828 A1 | 2/2002 | Mortl | |
| 2002/0032701 A1* | 3/2002 | Gao | H04L 29/06 715/240 |
| 2002/0049601 A1 | 4/2002 | Asokan et al. | |
| 2002/0083178 A1 | 6/2002 | Brothers | |
| 2002/0094870 A1 | 7/2002 | Murray | |
| 2002/0108050 A1 | 8/2002 | Raley et al. | |
| 2002/0116528 A1* | 8/2002 | Vale | G06F 3/0236 709/245 |
| 2002/0184256 A1 | 12/2002 | Reich et al. | |
| 2003/0044077 A1 | 3/2003 | Okada | |
| 2003/0069852 A1* | 4/2003 | Martin | H04L 63/0823 705/52 |
| 2003/0081125 A1* | 5/2003 | Sheldon | H04N 17/004 348/180 |
| 2003/0084170 A1 | 5/2003 | de Jong et al. | |
| 2003/0084453 A1 | 5/2003 | Laughlin et al. | |
| 2003/0163740 A1 | 8/2003 | Thjai et al. | |
| 2003/0195801 A1 | 10/2003 | Takakura et al. | |
| 2004/0039794 A1 | 2/2004 | Biby et al. | |
| 2004/0049673 A1 | 3/2004 | Song et al. | |
| 2004/0152477 A1* | 8/2004 | Wu | H04L 29/06 455/466 |
| 2004/0172528 A1* | 9/2004 | Tenereillo | H04L 63/0428 713/153 |
| 2004/0187027 A1 | 9/2004 | Chan | |
| 2004/0236962 A1 | 11/2004 | Wong et al. | |
| 2004/0250075 A1* | 12/2004 | Anthe, II | H04L 63/0823 713/175 |
| 2004/0250118 A1 | 12/2004 | Andreev et al. | |
| 2005/0022132 A1 | 1/2005 | Herzberg et al. | |
| 2005/0071256 A1 | 3/2005 | Singhal | |
| 2005/0114435 A1 | 5/2005 | DiPlacido et al. | |
| 2005/0119941 A1 | 6/2005 | James | |
| 2005/0132201 A1 | 6/2005 | Pitman et al. | |
| 2005/0149880 A1 | 7/2005 | Postrel | |
| 2005/0216516 A1 | 9/2005 | Calistri-Yeh et al. | |
| 2005/0277405 A1 | 12/2005 | Noguchi | |
| 2005/0278378 A1* | 12/2005 | Frank | G06F 16/38 |
| 2006/0013235 A1* | 1/2006 | Farnham | H04L 67/2819 370/401 |
| 2006/0026104 A1 | 2/2006 | Abe | |
| 2006/0047662 A1 | 3/2006 | Barik et al. | |
| 2006/0059125 A1 | 3/2006 | Yan | |
| 2006/0068818 A1 | 3/2006 | Leitersdorf et al. | |
| 2006/0136383 A1* | 6/2006 | Golla | G06F 16/435 |
| 2006/0143688 A1 | 6/2006 | Futoransky et al. | |
| 2006/0159088 A1 | 7/2006 | Aghvami et al. | |
| 2006/0168202 A1* | 7/2006 | Reshef | G06Q 10/107 709/224 |
| 2006/0168509 A1 | 7/2006 | Boss et al. | |
| 2006/0200855 A1* | 9/2006 | Willis | H04L 9/3213 726/2 |
| 2006/0277308 A1* | 12/2006 | Morse | G06F 17/30867 709/227 |
| 2007/0016951 A1* | 1/2007 | Piccard | G06F 21/552 726/24 |
| 2007/0067305 A1* | 3/2007 | Ives | G06F 17/30864 |
| 2007/0088820 A1* | 4/2007 | Kwak | G06F 16/9562 709/224 |
| 2007/0094352 A1 | 4/2007 | Choi et al. | |
| 2007/0143120 A1* | 6/2007 | Phadnis | G06F 3/0238 710/8 |
| 2007/0150285 A1* | 6/2007 | Friedman | G06F 3/16 704/270.1 |
| 2007/0168877 A1* | 7/2007 | Jain | G06F 3/0482 715/772 |
| 2007/0174905 A1 | 7/2007 | Martherus et al. | |
| 2007/0174913 A1* | 7/2007 | Kuroda | G06F 21/563 726/24 |
| 2007/0180021 A1 | 8/2007 | Hickman et al. | |
| 2007/0189217 A1* | 8/2007 | Wang | H04L 29/06027 370/331 |
| 2007/0213064 A1 | 9/2007 | Togahara | |
| 2007/0218912 A1* | 9/2007 | Song | H04L 63/0272 455/445 |
| 2007/0242680 A1* | 10/2007 | Signaoff | H04L 12/66 370/401 |
| 2007/0245224 A1* | 10/2007 | Hsu | G06F 16/2428 715/205 |
| 2007/0255702 A1* | 11/2007 | Orme | G06F 16/338 |
| 2007/0291108 A1* | 12/2007 | Huber | H04Q 11/00 348/14.02 |

(56) References Cited

U.S. PATENT DOCUMENTS

| | | | |
|---|---|---|---|
| 2008/0016233 A1* | 1/2008 | Schneider | G06F 16/951 709/230 |
| 2008/0046616 A1 | 2/2008 | Verzunov et al. | |
| 2008/0059474 A1* | 3/2008 | Lim | G06F 21/316 |
| 2008/0077697 A1 | 3/2008 | Chu et al. | |
| 2008/0104255 A1 | 5/2008 | Volodarsky et al. | |
| 2008/0163367 A1 | 7/2008 | Lee et al. | |
| 2008/0172341 A1 | 7/2008 | Crandell | |
| 2008/0177709 A1 | 7/2008 | Chiu et al. | |
| 2008/0195409 A1 | 8/2008 | Shankland | |
| 2008/0288489 A1* | 11/2008 | Kim | G06F 16/334 |
| 2009/0044004 A1* | 2/2009 | Wang | G06F 9/451 713/100 |
| 2009/0064047 A1* | 3/2009 | Shim | G06F 3/0482 715/835 |
| 2009/0082003 A1 | 3/2009 | Thorell | |
| 2009/0094361 A1* | 4/2009 | Srinivasan | H04L 65/1073 709/224 |
| 2009/0144288 A1* | 6/2009 | Refuah | G06Q 20/14 |
| 2009/0144308 A1* | 6/2009 | Huie | G06Q 10/107 |
| 2009/0157802 A1 | 6/2009 | Kang et al. | |
| 2009/0172775 A1 | 7/2009 | Mardikar et al. | |
| 2009/0210391 A1 | 8/2009 | Hall et al. | |
| 2009/0216760 A1 | 8/2009 | Bennett | |
| 2009/0300351 A1 | 12/2009 | Lei et al. | |
| 2009/0313318 A1* | 12/2009 | Dye | G06Q 30/00 709/202 |
| 2009/0319956 A1* | 12/2009 | Emard | G06F 16/904 715/854 |
| 2010/0005347 A1* | 1/2010 | Kim | H04L 67/36 714/57 |
| 2010/0030752 A1 | 2/2010 | Goldentouch | |
| 2010/0104094 A1 | 4/2010 | Takashima | |
| 2010/0131902 A1* | 5/2010 | Teran | G06F 16/9535 715/843 |
| 2010/0138485 A1 | 6/2010 | Chow et al. | |
| 2010/0262676 A1* | 10/2010 | Tanaka | G06F 16/9577 709/219 |
| 2010/0306184 A1* | 12/2010 | Wang | H04L 63/02 707/707 |
| 2010/0306547 A1 | 12/2010 | Fallows et al. | |
| 2010/0318890 A1 | 12/2010 | Billharz et al. | |
| 2010/0325195 A1 | 12/2010 | Kamp | |
| 2011/0035505 A1 | 2/2011 | Jakobsson | |
| 2011/0066625 A1* | 3/2011 | Fukui | G06F 16/9537 707/748 |
| 2011/0066732 A1* | 3/2011 | Iwade | G06F 17/30902 709/227 |
| 2011/0072038 A1* | 3/2011 | Burge | G06F 16/951 707/769 |
| 2011/0106637 A1 | 5/2011 | Goto et al. | |
| 2011/0125092 A1* | 5/2011 | Hepworth | A61F 2/186 604/103.02 |
| 2011/0149737 A1 | 6/2011 | Muthiah et al. | |
| 2011/0161479 A1 | 6/2011 | Freishtat et al. | |
| 2011/0207433 A1 | 8/2011 | Miyamoto | |
| 2011/0231482 A1 | 9/2011 | Benna | |
| 2012/0016975 A1 | 1/2012 | Rothschild | |
| 2012/0030774 A1 | 2/2012 | Keith et al. | |
| 2012/0036178 A1 | 2/2012 | Gavini et al. | |
| 2012/0124372 A1 | 5/2012 | Dilley et al. | |
| 2012/0126976 A1* | 5/2012 | Bugenhagen | H04L 67/02 340/540 |
| 2012/0210413 A1 | 8/2012 | Akula et al. | |
| 2012/0246737 A1* | 9/2012 | Paxton | G06F 21/316 726/27 |
| 2012/0266090 A1* | 10/2012 | Nealer | G06F 16/958 715/760 |
| 2012/0304263 A1 | 11/2012 | Lee et al. | |
| 2012/0324227 A1 | 12/2012 | Swildens | |
| 2013/0007219 A1* | 1/2013 | Sorenson, III | H04L 67/28 709/219 |
| 2013/0055078 A1 | 2/2013 | Berger et al. | |
| 2013/0091537 A1* | 4/2013 | Parla | H04L 63/10 726/1 |
| 2013/0124651 A1 | 5/2013 | Ding | |
| 2013/0125005 A1* | 5/2013 | French | G06F 16/951 715/738 |
| 2013/0138964 A1 | 5/2013 | Joyce | |
| 2013/0173912 A1 | 7/2013 | Cui et al. | |
| 2013/0212679 A1* | 8/2013 | Ansari | H04L 63/1416 726/22 |
| 2013/0227713 A1 | 8/2013 | Keith et al. | |
| 2013/0246509 A1* | 9/2013 | Sakiyama | G06F 3/1203 709/203 |
| 2013/0275264 A1 | 10/2013 | Lindenberg | |
| 2013/0290865 A1 | 10/2013 | Kageyama | |
| 2013/0339842 A1* | 12/2013 | Zhang | G06F 16/957 715/234 |
| 2014/0006399 A1* | 1/2014 | Vasudevan | G06F 16/9535 707/737 |
| 2014/0012751 A1 | 1/2014 | Kuhn et al. | |
| 2014/0059029 A1 | 2/2014 | Magill et al. | |
| 2014/0074815 A1* | 3/2014 | Plimton | G06F 16/26 707/709 |
| 2014/0075525 A1* | 3/2014 | Ferlin | G06Q 20/3255 726/6 |
| 2014/0082715 A1 | 3/2014 | Grajek et al. | |
| 2014/0129733 A1* | 5/2014 | Klais | H04L 45/22 709/239 |
| 2014/0133354 A1* | 5/2014 | Scharf | H04L 45/42 370/254 |
| 2014/0165132 A1 | 6/2014 | Stuntebeck et al. | |
| 2014/0165153 A1 | 6/2014 | Dabbiere et al. | |
| 2014/0208199 A1 | 7/2014 | Peleg | |
| 2014/0214671 A1 | 7/2014 | Desilva et al. | |
| 2014/0317120 A1* | 10/2014 | Ghose | G06F 16/9535 707/738 |
| 2014/0334622 A1 | 11/2014 | Smyth et al. | |
| 2014/0351236 A1* | 11/2014 | Zhu | G06F 16/955 707/709 |
| 2014/0359424 A1* | 12/2014 | Lin | G06F 16/955 715/234 |
| 2014/0359578 A1 | 12/2014 | Jesse et al. | |
| 2014/0372873 A1* | 12/2014 | Leung | G06F 16/958 715/243 |
| 2014/0380477 A1 | 12/2014 | Li et al. | |
| 2015/0039442 A1* | 2/2015 | Sidman | G06F 16/957 705/14.66 |
| 2015/0200994 A1 | 7/2015 | Jain et al. | |
| 2015/0295991 A1* | 10/2015 | Zhang | H04L 67/1095 709/203 |
| 2016/0150044 A1 | 5/2016 | Sze et al. | |
| 2016/0285861 A1 | 9/2016 | Chester | |
| 2017/0024423 A1 | 1/2017 | Liang et al. | |
| 2017/0109797 A1 | 4/2017 | Boffa et al. | |
| 2017/0171200 A1 | 6/2017 | Bao et al. | |
| 2019/0386961 A1* | 12/2019 | Kupisiewicz | H04L 12/4641 |

FOREIGN PATENT DOCUMENTS

| | | | |
|---|---|---|---|
| CN | 100576797 | | 3/2008 |
| CN | 101150407 A | | 3/2008 |
| CN | 101309275 A | | 11/2008 |
| CN | 101527819 A | * | 9/2009 |
| CN | 101620531 A | * | 1/2010 |
| CN | 101639774 A | * | 2/2010 |
| CN | 101807180 A | | 8/2010 |
| CN | 102024012 A | | 4/2011 |
| CN | 102271123 A | | 12/2011 |
| CN | 102420842 A | * | 4/2012 |
| CN | 102446222 A | | 5/2012 |
| CN | 102546530 A | | 7/2012 |
| CN | 102591916 A | * | 7/2012 |
| CN | 102647481 A | | 8/2012 |
| CN | 102682009 A | | 9/2012 |
| CN | 103116723 A | * | 5/2013 ......... H04L 63/1466 |
| CN | 103227786 A | * | 7/2013 |
| CN | 103414562 A | | 11/2013 |
| CN | 103414562 A | * | 11/2013 |

(56) References Cited

FOREIGN PATENT DOCUMENTS

| | | | | | |
|---|---|---|---|---|---|
| CN | 103729440 | A | | 4/2014 | |
| CN | 103729440 | A | * | 4/2014 | |
| CN | 104182401 | A | * | 12/2014 | ........... G06F 16/951 |
| EP | 2568378 | A1 | * | 3/2013 | ........... G06F 3/0484 |
| JP | 2010092144 | A | | 4/2010 | |
| JP | 2011165156 | A | | 8/2011 | |
| JP | 2012039198 | A | | 2/2012 | |
| WO | WO-2004084071 | A1 | * | 9/2004 | ........... G06F 21/563 |
| WO | WO-2014187218 | A1 | * | 11/2014 | ........... G06F 16/951 |
| WO | WO 2015/014189 | A1 | | 2/2015 | |

OTHER PUBLICATIONS

Zhang, Lu, Junzhou Luo, Ming Yang, and Gaofeng He. "Application-level attack against Tor's hidden service." In Pervasive Computing and Applications (ICPCA), 2011 6th International Conference on, pp. 509-516. IEEE, 2011. (Year: 2011).*

Herzberg, Amir, and Ahmad Jbara. "Security and identification indicators for browsers against spoofing and phishing attacks." ACM Transactions on Internet Technology (TOIT) 8, No. 4 (2008): 1-36. (Year: 2008).*

Shue, Craig A., and Minaxi Gupta. "Sensitive data requests: do sites ask correctly?." In 2009 IEEE International Conference on Communications, pp. 1-5. IEEE, 2009. (Year: 2009).*

Bartell, "The MediaXact System—A Framework for Personalized Electronic Commerce Services", Bell Labs Technical Journal, Apr.-Jun. 1999, pp. 153-173. (Year: 1999).

International Search Report and Written Opinion for Application No. PCT/CN2014/081026 dated Sep. 26, 2014.

Office Action and Search Report for Chinese Patent Application No. 201310744195.6 dated Dec. 19, 2016, 8 pages.

Office Action for Chinese Patent Application No. 201310334944.8 dated Dec. 5, 2016, 4 pages.

Office Action for Chinese Patent Application No. 201310334944.8 dated Nov. 25, 2015, 4 pages.

Office Action for Chinese Patent Application No. 2013103349448.8 dated May 23, 2016, 4 pages.

Office Action for Chinese Patent Application No. 201310744195.6 dated May 4, 2016, 7 pages.

Search Report for Chinese Patent Application No. 201310334944.8, dated Nov. 17, 2015, 2 pages.

Stratton, "Issues Essential to World Wide Marketing", ACM SIGICE Bulletin, vol. 22, No. 4, Apr. 1997, pp. 2-16. (Year: 1997).

Office Action for U.S. Appl. No. 14/909,629, dated May 6, 2019, 36 pages.

Ion, et al., "For some eyes only: protecting online information sharing," In Proceedings of the third ACM conference on Data and application security and privacy, 12 pages, (2013).

Knowlton, "Comparing Web servers to streaming media servers," Chris Knowlton's Blog, 12 pages, (2007). [Retrieved from the Internet Oct. 17, 2019: <URL: https://blogslis.net/chriskno/comparing-web-servers-to-streaming-media-servers>].

Malik, et al. "Secure Vault: A privacy preserving reliable architecture for Secure Social Networking," In 2011 7th International Conference on Information Assurance and Security (IAS), IEEE, pp. 116-121, (2011).

Notice of Allowance and Examiner Initiated Interview Summary for U.S. Appl. No. 14/909,629 dated May 14, 2020, 17 pages.

Office Action for U.S. Appl. No. 14/909,629 dated Oct. 28, 2019, 40 pages.

* cited by examiner

Apparatus 900 for controlling the authority of a user to access a webpage

Apparatus 1100 for controlling the authority of a user to access a webpage

METHOD AND APPARATUS FOR ACCESSING WEBSITE

CROSS REFERENCE TO RELATED APPLICATIONS

This application is a divisional of application Ser. No. 14/909,629 filed Feb. 2, 2016, which is a national phase entry of International Application No. PCT/IB2012/054699, filed Jun. 27, 2014, which claims priority to Chinese Application Nos. 201310334944.8 filed Aug. 2, 2013 and 201310744195.6 filed Dec. 30, 2013, the entire contents of which are incorporated herein by reference.

FIELD OF THE INVENTION

The present invention relates to the field of communication technologies, and more specifically, to a method and an apparatus for accessing a website.

BACKGROUND

A browser displays webpages on a terminal. A user may access desired websites through a browser to obtain corresponding information.

The process how a browser accesses a website mainly comprises the following steps: 1. the terminal acquires the web address typed by a user on the browser; 2. the terminal determines a server corresponding to the web address; 3. the terminal establishes a transport layer connection with the server; 4. the terminal sends a network request to the server through an established transport layer connection; and 5. the terminal receives webpage data of the website sent by the server, and renders the webpage according to the webpage data. By performing the above steps, a browser can access the content of a target website. Since the access process needs to go through the above series of steps, the user has to wait for a while to view the webpage of the target website on the browser after the user types the web address in the browser.

To shorten the waiting time of a user in the website access process, currently available technical solutions for pre-reading webpage contents mainly comprise the following steps: acquiring historical access data of web address on a terminal, the history data at least comprising web address access weights and web address historical access times; based on the web address access weights and web address historical access times, calculating an access probability coefficient for a web address, and selecting web addresses with access probability coefficients greater than a threshold; pre-reading contents of webpages corresponding to the selected predetermined number of web addresses; caching the pre-read webpage contents in the browser of the terminal. Some problems need to be addressed in the current techniques.

Since the pre-read webpage contents contain a lot of data, e.g. webpage main documents, CSS style, JS script and other data, the network data for acquiring these data will be wasted if the pre-read webpage contents have not been used throughout the website access process. Moreover, it requires plentiful system resources, such as memory and processor, to store these webpage contents. As a result, the existing method of pre-reading webpage contents will take up a relatively great amount of network data and consume a lot of system resources.

BRIEF SUMMARY

Embodiments of the present invention provide a method and an apparatus for accessing a website to ensure that the network data is reduced and the consumption of system resources is lowered, while webpages are rapidly accessed.

One embodiment of the present invention provides a method for accessing a website, the method comprising: acquiring a web address that meets a preset condition; determining a server corresponding to the web address; establishing a transport layer connection with the server; and upon receiving an instruction for accessing a website corresponding to the web address, using the transport layer connection to send a network request to the server for acquiring the webpage content of the website.

Another embodiment of the present invention provides an apparatus for accessing a website, the apparatus comprising: an acquisition module configured to acquire a web address that meets a preset condition; a determination module configured to determine a server corresponding to the web address; an establishing module configured to establish a transport layer connection with the server; and a sending module configured to, upon receiving an instruction for accessing a website corresponding to the web address, use the transport layer connection to send a network request to the server for acquiring the webpage content of the website.

These and other embodiments and advantages and features of the present invention are described further herein as a solution that not only saves the time to visit a web site, but also consumes less network and system resources.

BRIEF DESCRIPTION OF THE DRAWINGS

Figure 1:
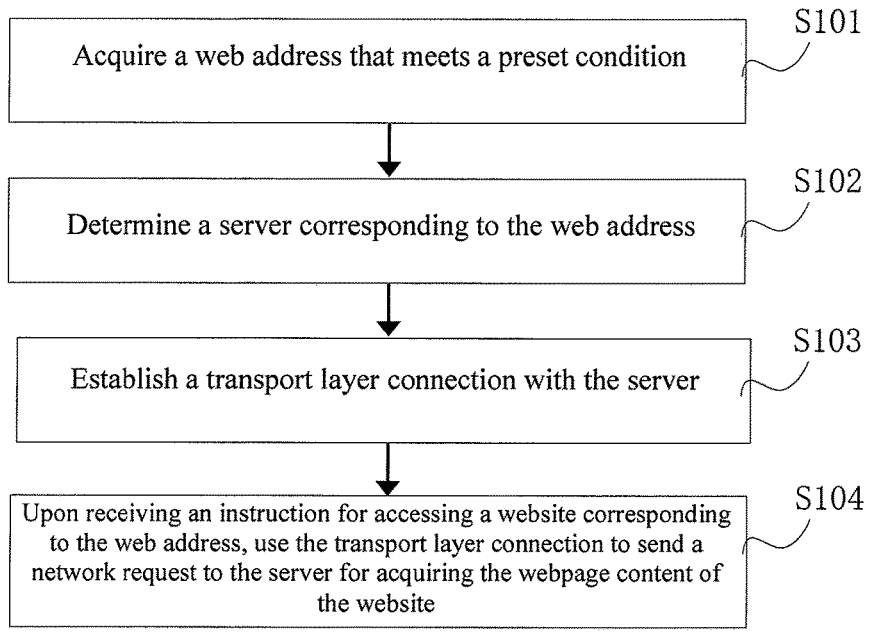
Figure 2:
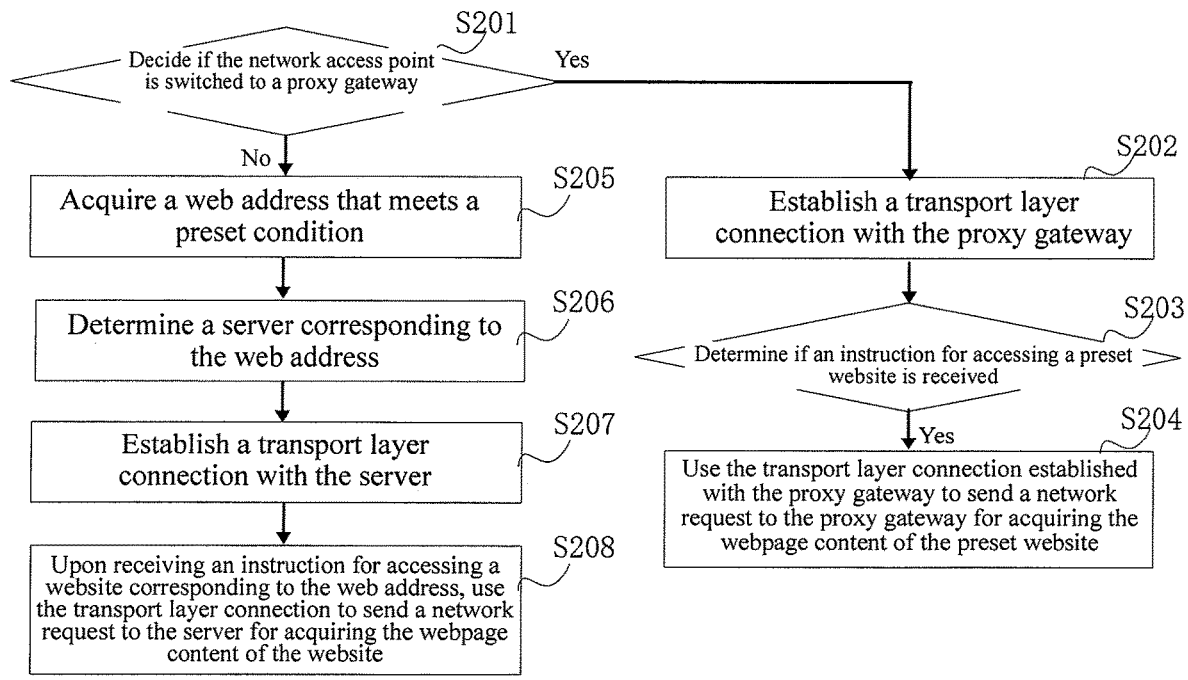
Figure 3:
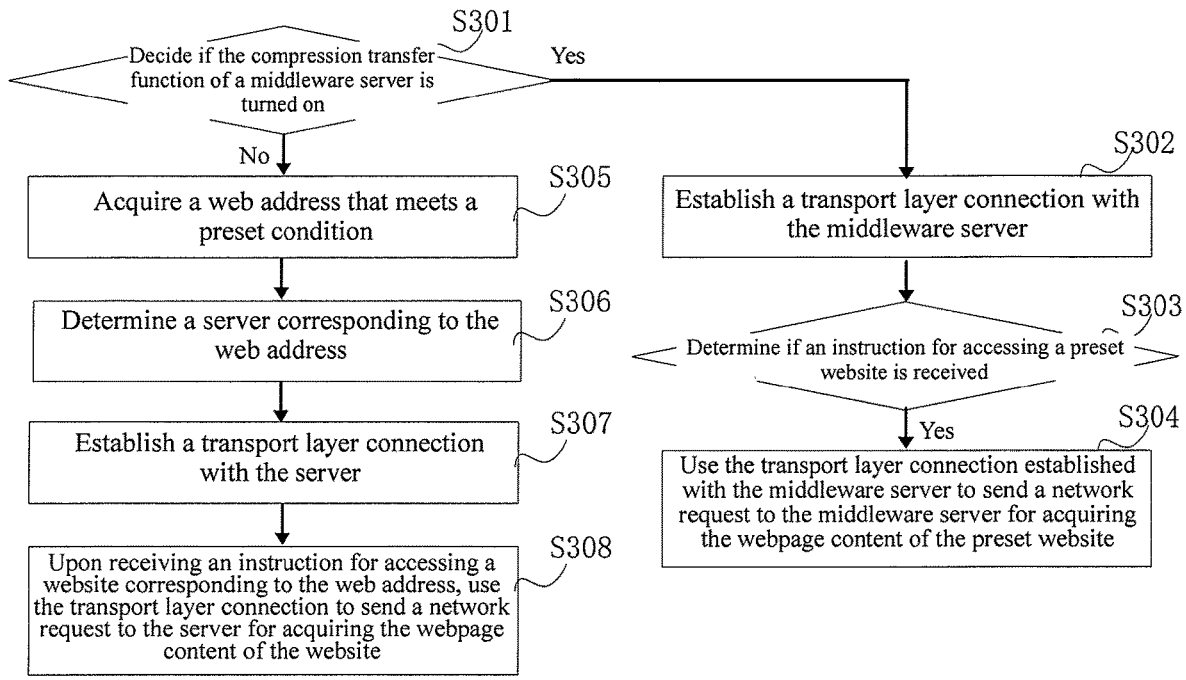
Figure 4:
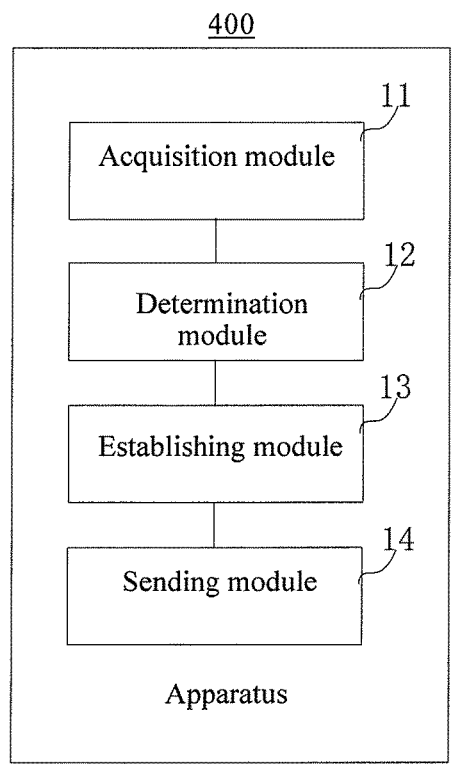
Figure 5:
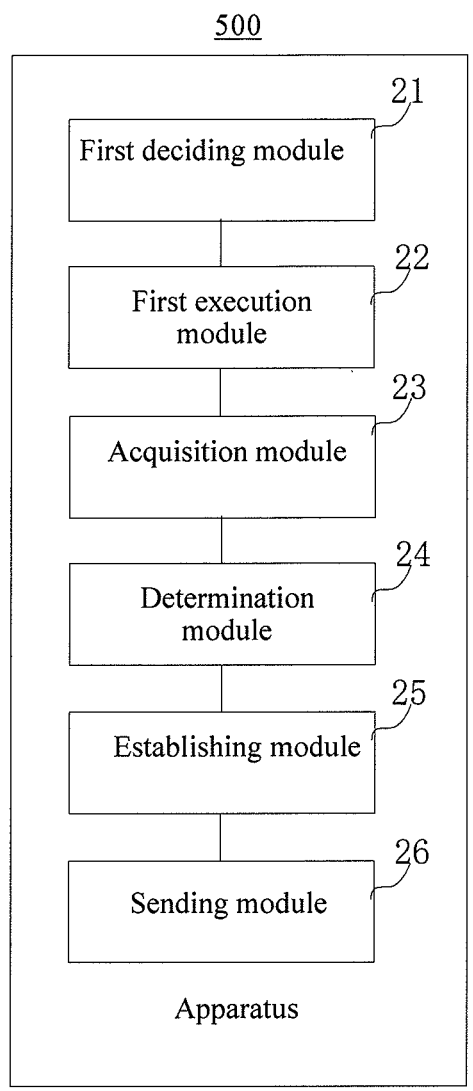
Figure 6:
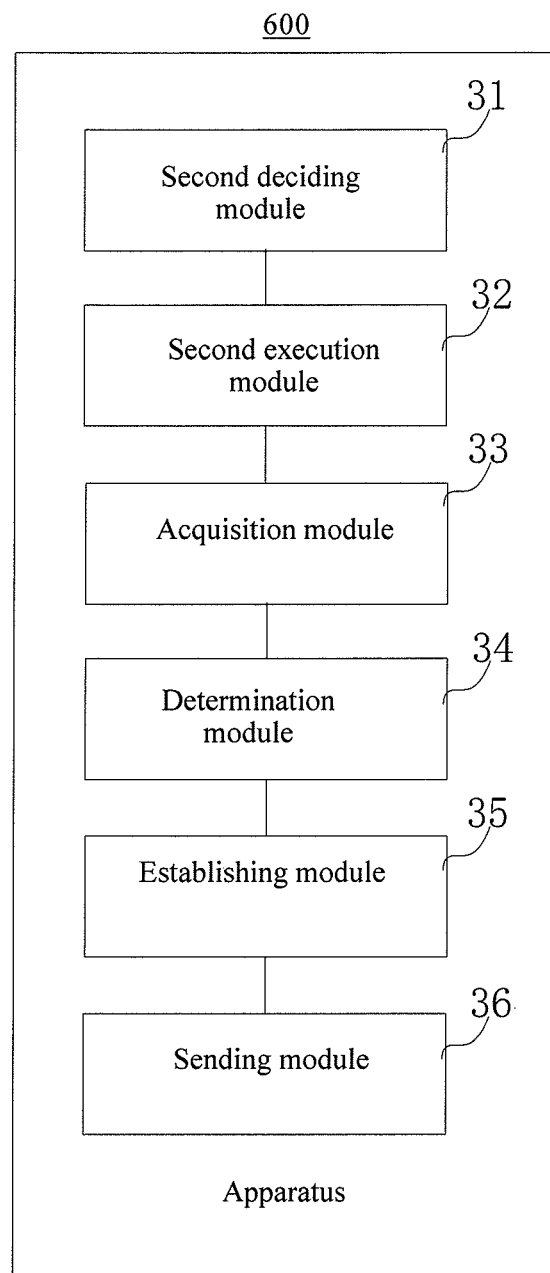
Figure 7:
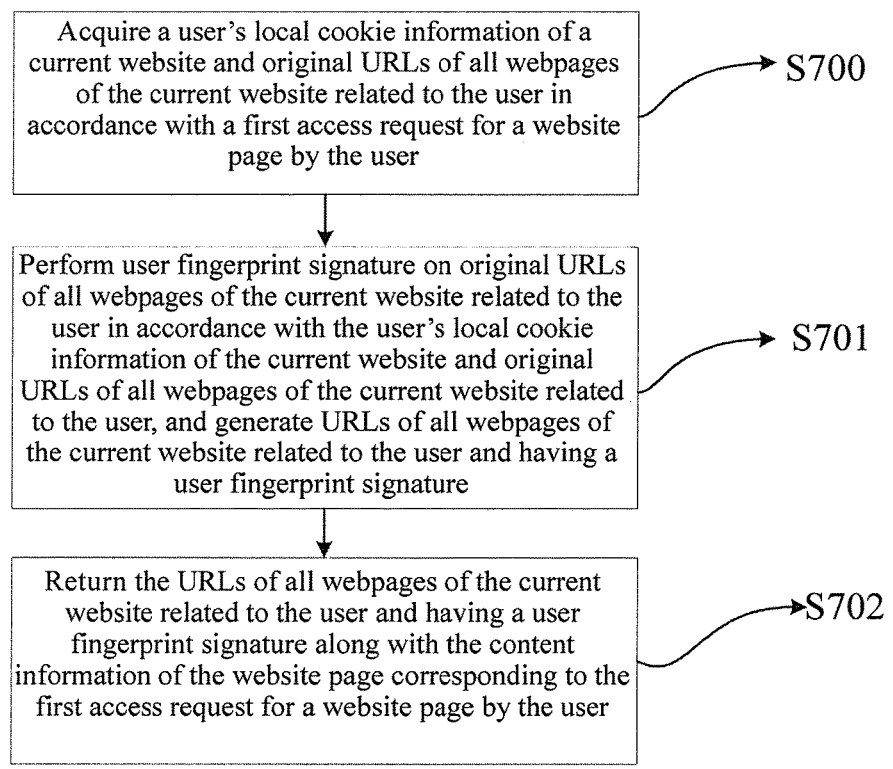
Figure 8:
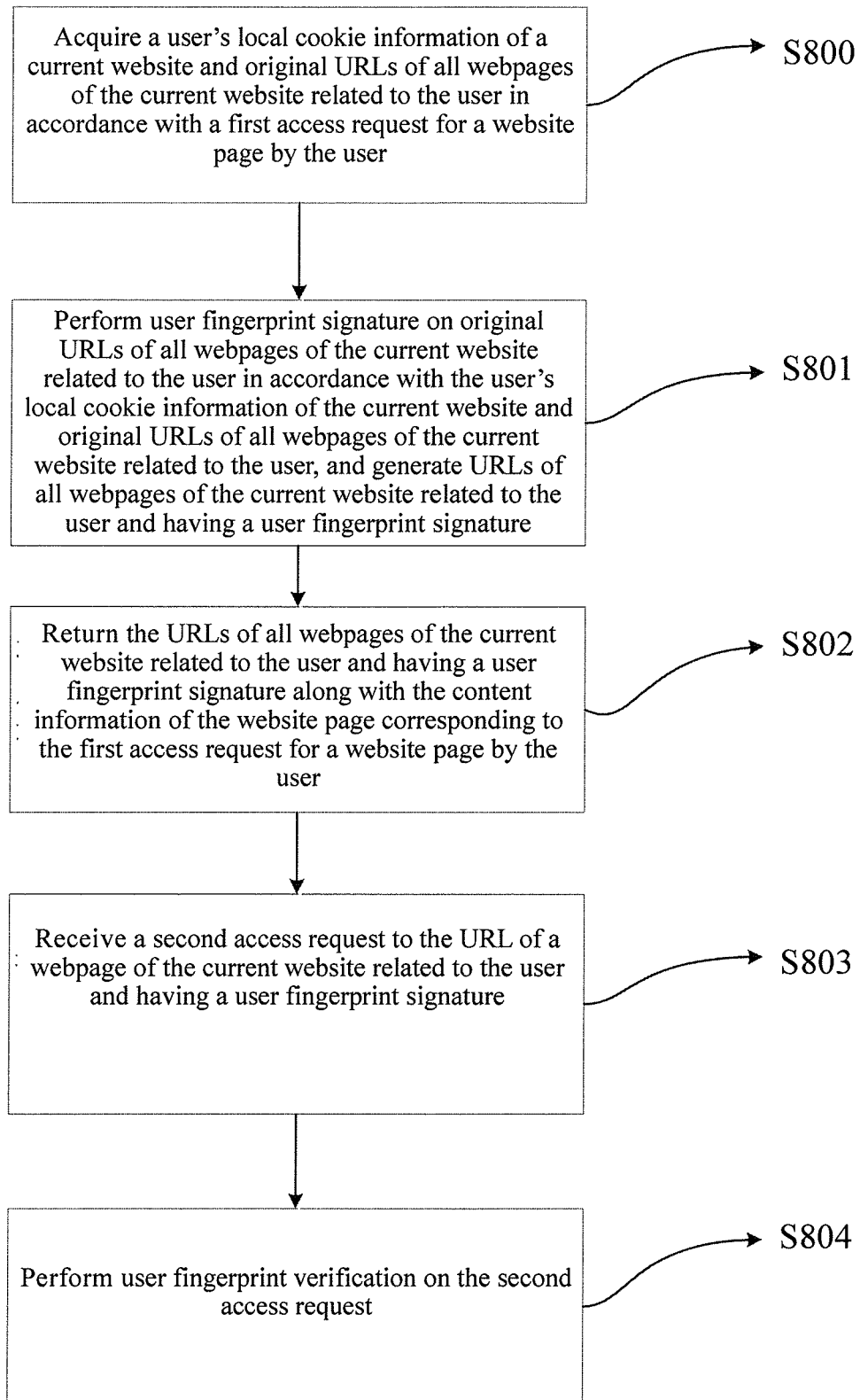
Figure 9:
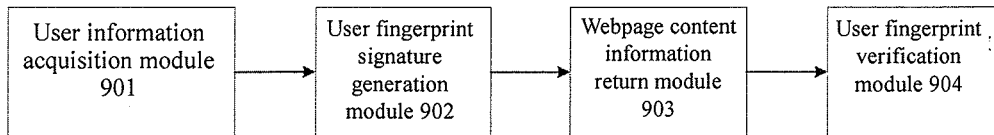
Figure 10:
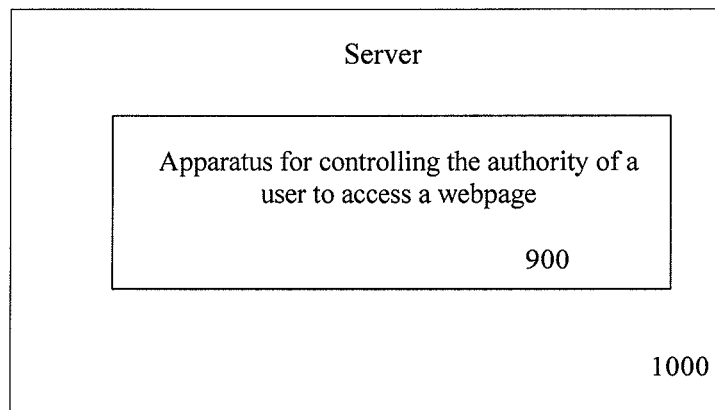
Figure 11:
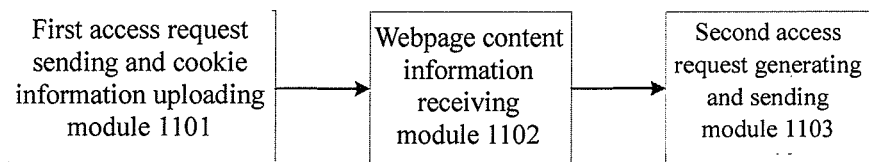

Having thus described the example embodiments of the present invention in general terms, reference will now be made to the accompanying drawings, which are not necessarily drawn to scale, and wherein:

FIG. 1 is a flow chart of a method for accessing a website according to an embodiment of the present invention;

FIG. 2 is a flow chart of another method for accessing a website according to an embodiment of the present invention;

FIG. 3 is a flow chart of another method for accessing a website according to an embodiment of the present invention;

FIG. 4 illustrates an apparatus for accessing a website according to an embodiment of the present invention;

FIG. 5 illustrates a block diagram of an apparatus for accessing a website according to an embodiment of the present invention;

FIG. 6 illustrates a block diagram of an apparatus for accessing a website according to an embodiment of the present invention;

FIG. 7 is a flow chart of a method for authority control of a user access to a webpage according to an embodiment of the present invention;

FIG. 8 is a flow chart of a method for authority control of a user access to a webpage according to another embodiment of the present invention;

FIG. 9 is a block diagram of an apparatus for authority control of a user access to a webpage according to another embodiment of the present invention;

FIG. 10 is a block diagram of a server for authority control of a user access to a webpage according to another embodiment of the present invention; and FIG. 11 is a block diagram of a browser client according to an embodiment of the present invention.

DETAILED DESCRIPTION

The present disclosure now will be described more fully with reference to the accompanying drawings, in which some, but not all embodiments of the disclosure are shown. This disclosure may be embodied in many different forms and should not be construed as limited to the embodiments set forth; rather, these example embodiments are provided so that this disclosure will be thorough and complete, and will fully convey the scope of the disclosure to those skilled in the art. Like numbers refer to like elements throughout.

Embodiments of the present invention provide a method and an apparatus for accessing a website. Since there are a variety of ways to specifically implement the above method and apparatus for accessing a website, detailed description will be made below through specific examples:

Example I

FIG. 1 shows a method for accessing a website. The method is applied on a terminal. The terminal may be a smart device, such as a computer, a laptop, a tablet or a cell phone. The solution according to the method not only can save the time to access a web site, but also occupies less network and system resources. The method comprises:

Step S101: acquiring a web address that meets a preset condition.

The preset condition may be under a specific application scenario. Several specific application scenarios will be briefly introduced below.

In the first application scenario, when a terminal receives an instruction to start a browser a web address that meets a preset condition is acquired. In the first application scenario, the web address that meets a preset condition may be defined as condition met web address. The condition met web address includes the web address of the website that is historically accessed most frequently (hereinafter "most frequent accessed web address") and the web address of the website that was last accessed prior to the previous exit (hereinafter "last access web address"), both of which are saved in the browser.

Specifically, when a user starts a browser on the terminal, the terminal will voluntarily acquire the most frequent accessed web address and the last accessed web address.

In the second application scenario, upon receipt of an instruction to click the website link, a web address of the desired website link is acquired. In the second application scenario, the web address that meets a preset condition is the web address associated with the desired website link. Specifically, when a user clicks on a webpage link or a link of a navigation logo in the browser, i.e. when the finger touches the screen, the web address of the desired webpage link or the link of the navigation logo will be immediately acquired. When the user opens a webpage associated with the desired website link or disconnection occurs due to instable network or various reasons, the desired webpage link is immediately acquired.

In the third application scenario, upon receipt of an instruction to enter a preset interface of a browser, a web address in the preset interface that meets a preset condition is acquired. In the third application scenario, the preset interface of the browser has a number of types. For example, the preset interface may be a functional interface, a web address input interface or a search interface. The functional interface may be a navigation, bookmark or application center.

Specifically, upon receipt of an instruction to enter a functional interface of a browser, a web address of the website that was accessed the most recently and a web address of the website that is most frequently accessed in the functional interface is acquired; upon receipt of an instruction to enter a web address input interface of a browser, top three web addresses displayed in the web address matching list as well as a web address of the website that was accessed the most recently are acquired. Upon receipt of an instruction to enter a search interface of a browser, a web address of the selected search engine is acquired.

In the fourth application scenario, upon receipt of an instruction to enter a target website, a desired web address associated with a website link that meets a preset condition in the target website is acquired. In the fourth application scenario, the target website may be a website randomly selected by a user. The web address includes all web addresses contained in webpages of the target website. In a preferred solution, the step of acquiring the desired web address may further comprise the following steps: acquiring all web addresses contained in webpages of the target website; identifying servers corresponding to these web addresses; identifying a server associated with the most web addresses; acquiring web address of the server.

In the fifth application scenario, a desired web address of a website link that meets a preset condition is acquired when the browser system configurations are changed. In the fifth application scenario, when a user enables the compression-transfer setting on web client, web address of an intermediary will be automatically acquired and a connection with the intermediary is established. When the user opens a desired webpage associated with the website link or disconnection occurs due to instable network or various reasons, the webpage link is immediately acquired.

In the sixth application scenario, when a browser displays in the address bar a desired web address typed by a user, the browser may perform real-time character input parsing and determination on the user's input. When the user inputs .com, .cn, .org, or .net or symbols, it is determined that a preset condition is met. The desired web address is acquired from the address bar. In embodiments of the present invention, a plurality of web addresses may be obtained according to the user's input.

The above six application scenarios are all specific scenarios of acquiring a condition met web address, which is certainly not limited thereto. Many kinds of application scenarios are not described. However, any application scenarios that can acquire a condition met web address shall be included by the present invention.

Step S102: determining web server with which the desired web address is associated.

When a desired web address that meets a preset condition is acquired, it may need to determine a web server with which the desired web address is associated. The web address that meets a preset condition may be defined as condition met web address. The process to determine the web server is as follows: a terminal determines the IP address of the web server via a DNS server. When the IP address of the web server is acquired, the web server is determined.

Step S103: establishing a transport layer connection with the web server.

The transport layer connection comprises TCP connection and UDP connection. When the web server is determined, the terminal may establish a transport layer connection with the web server. In this step, a transport layer connection is established without initiating a network request such as HTTP. When the transport layer connection is established between the client and the server, therefore, only a small number of network data packets will be generated, which will not result in the waste of data. Moreover, in the process of establishing a transport layer connection, the occupation of system resources such as memory and processor is very low.

After Step S103, when the terminal does not receive an instruction to access a desired web site within a period of time, or when web addresses accessed on the terminal do not contain the desired web site corresponding to the condition met web address, the established transport layer connection between the terminal and the server may be disconnected because these two circumstances indicate that the user may not use the established transport layer connection. Although the transport layer connection can remain connected, such a transport layer connection that has been successfully established but not used will nevertheless occupy certain memory, and will consume part of the data. Therefore, when it is determined that the established transport layer connection will not be used, it may be disconnected.

Step S104: upon receipt of an instruction to access a desired website associated with the desired web address, the transport layer is used to send a network request to the server for acquiring the webpage content of the desired web site.

When the terminal receives an instruction to access the desired website, the transport layer connection with the web server may be used. Since the transport layer connection has been established, the time to establish a transport layer connection is saved, thereby increasing the speed of the terminal to access the desired web site.

In the embodiment shown in FIG. 1, a transport layer connection with the web server corresponding to a desired condition met web address may be established prior to accessing a website corresponding to the desired web address. If a web address being accessed by a user is the condition met web address, then a network request may be sent to the web server using the established transport layer connection, thereby saving time for establishing a transport layer connection and improving the efficiency of accessing a website. Moreover, when a transport layer connection is established with a web server prior to accessing a website, only data necessary for establishing the transport layer connection is requested. Therefore, only a small number of data packets are generated. Data necessary for establishing the transport layer connection may not include webpage main documents, CSS style and JS script, which may reduce the network data. Furthermore, prior to receiving an instruction for accessing a website corresponding to the web address, establishing a transport layer connection with the server without requesting more data from the server results in a very low occupation of system resources such as memory and processor. When it is determined that the user no longer needs to access the webpage, the resources can be released. Therefore, the solution according to the present invention not only saves the time to access a website, but also occupies relatively few network and system resources.

Example II

FIG. 2 shows another method for accessing a website. The method is applied on a terminal. The terminal may be a device, such as a computer, a laptop, a tablet or a cell phone. The solution can save time to access a website and occupies less network and system resources. When the network access point is switched to a proxy gateway, moreover, it can also save the time to access the proxy gateway. The method comprises:

Step S201: determining whether the network access point is switched to a proxy gateway. If yes, go to Step S202. Otherwise, go to Step S205.

The proxy gateway may specifically be a WAP (Wireless Application Protocol) gateway, comprising cmwap (China Mobile wap), ctwap (China Telecom wap) and 3 gwap. The network access point may be set up on a terminal. If a user switches the network access point to a proxy gateway, a transport layer connection may be established with the proxy gateway in advance. When the user accesses a website, the established transport layer connection may be used, thereby increasing the speed of accessing websites in the presence of a proxy gateway.

Step S202: establishing a transport layer connection with the proxy gateway.

When a transport layer connection with the proxy gateway is established, if the transport layer connection between the client and the proxy gateway is disconnected due to instable network or various reasons, the transport layer connection may be re-established. When the network access point is switched to a non-proxy gateway, the transport layer connection between the client and the proxy gateway is disconnected.

Step S203: determining if an instruction to access a preset website is received, if yes, go to Step S204.

Step S204: a network request may be sent to the proxy gateway using the established transport layer connection with the proxy gateway to acquire the webpage content of the preset website.

When the proxy gateway receives a network request from the terminal to acquire the webpage content of the desired website, the proxy gateway may determine a server according to the web address specified in the network request, and send the network request to the server. When the proxy gateway receives the webpage content of the desired website from the server, the proxy gateway will send the webpage content of the desired website to the terminal via the established transport layer connection. The terminal then performs operations of loading, parsing, setting and rendering on the webpage content of the desired website, so as to generate a webpage of the desired website for user.

Step S205: acquiring a desired web address that meets preset condition.

The web address that meets preset condition may be defined as condition met web address. The preset condition may be a specific application condition in some specific application scenarios. The specific application scenarios are the same as the scenarios of the condition met web address in Example I, which will not be repeated herein.

Step S206: determining a web server with which the web address is associated.

When a desired condition met web address is acquired, it may need to determine a web server with which the desired web address is associated. The process to determine the web server is as follows: a terminal determines the IP address of the web server via a DNS server. When the IP address of the web server is acquired, the web server is determined.

Step S207: establishing a transport layer connection with the web server.

The transport layer connection comprises TCP connection and UDP connection. When the web server is determined, the terminal may establish a transport layer connection with the web server. In this step, a transport layer connection is established without initiating a network request such as HTTP network request. When the transport layer connection is established between the client and the server, therefore, only a small number of network data packets will be generated, which will avoid waste of data. Moreover, in the process of establishing a transport layer connection, the occupation of system resources such as memory and processor is very low.

After step S207 is performed, when the terminal does not receive an instruction to access a desired web site within a period of time, or when web addresses being accessed does not contain the desired web site corresponding to the condition met web address, the established transport layer connection between the terminal and the server may be disconnected, since the established transport layer connection may not be used. Although the transport layer connection can remain connected, it will nevertheless occupy certain memory, and will consume part of the data. Therefore, when it is determined that the established transport layer connection will not be used, the transport layer connection may be disconnected.

Step S208: upon receipt of an instruction to access a website associated with the desired web address, a network request is sent to the server using the transport layer to acquire the webpage content of the desired website.

When the terminal receives an instruction to access the desired website, the transport layer connection with the web server may be used. Since the transport layer connection has been established, the time to establish a transport layer connection is saved, thereby increasing the speed of the terminal to access the desired website.

The embodiment shown in FIG. 2 can save the time to access a website, and occupy less network and system resources. When the network access point is switched to a proxy gateway, moreover, it can also save the time to access the proxy gateway.

Example III

FIG. 3 shows another method for accessing a website. The method is applied on a terminal. The terminal may be a device, such as a computer, a laptop, a tablet or a cell phone. The solution according to the method can save the time to access a website and occupies less network and system resources. When a user enables compression-transfer setting on an intermediary, it can save the time to access the intermediary. The method comprises:

Step S301: determining whether the compression-transfer setting of the intermediary is enabled. If yes, go to Step S302. Otherwise, go to Step S305.

The compression-transfer setting may be enabled on web client. The user may enable or disable the compression-transfer setting depending upon his/her demand. If the compression-transfer setting is enabled on web client browser, the web client browser needs to go through an intermediary before accessing the server of the website. If the compression-transfer setting is enabled on the web client browser, the transport layer connection with the intermediary may be established in advance which can save the time for a client to access the web server.

Step S302: establishing a transport layer connection with the intermediary.

When a transport layer connection with the intermediary is established, if the transport layer connection between the client and the intermediary is disconnected due to instable network or various reasons, the transport layer connection between the client and the intermediary may be re-established. When the compression-transfer setting is disabled, the transport layer connection between the client and the intermediary is disconnected.

Step S303: determining whether an instruction to access a desired website is received. If yes, go to Step S304.

Step S304: a network request may be sent to the intermediary using the established transport layer connection with the intermediary to acquire the webpage content of the desired website.

When the intermediary receives a network request to acquire the webpage content of the desired website from the terminal, the intermediary may determine a web server according to the web address specified in the network request, and send the network request to the web server. When the intermediary receives the webpage content of the desired website from the web server, the intermediary will perform compression process on files, such as images, in the webpage content so as to reduce the storage space occupied by the webpage content, and send the compressed webpage content to the terminal. The terminal then performs operations of loading, parsing, setting and rendering on the compressed webpage content, so as to generate a webpage of the desired website for user.

Step S305: acquiring a desired web address that meets preset condition.

The preset condition may be a specific application condition in some specific application scenarios. The web address that meets preset condition may be defined as condition met web address. The specific application scenarios are the same as the scenarios in Example I, which will not be repeated herein.

Step S306: determining a web server with which the web address is associated.

When the desired condition met web address is acquired, it may need to determine a web server with which the desired web address is associated. The process to determine the web server is as follows: a terminal determines the IP address of the web server via a DNS server. When the IP address of the web server is acquired, the web server is determined.

Step S307: establishing a transport layer connection with the web server.

The transport layer connection comprises TCP connection and UDP connection. When the web server is determined, the terminal may establish a transport layer connection with the web server. In this step, a transport layer connection is established without initiating a network request such as HTTP network request. When the transport layer connection is established between the client and the server, therefore, only a small number of network data packets will be generated, which will not result in the waste of data. Moreover, in the process of establishing a transport layer connection, the occupation of system resources such as memory and processor is very low.

After Step S307, when the terminal does not receive an instruction to access a desired web site within a period of time, or when web addresses accessed on the terminal do not contain the desired web site corresponding to the condition met web address, the established transport layer connection between the terminal and the server may be disconnected because the established transport layer connection may not be used. Although the transport layer connection can remain connected, it may occupy certain memory and consume part of the data. Therefore, when it is determined that the established transport layer connection will not be used, it may be disconnected.

Step S308: upon receipt of an instruction to access a desired website associated with the desired web address, a network request may be sent to the web server using the transport layer connection to acquire the webpage content of the desired website.

When the terminal receives an instruction to access the desired website, the transport layer connection with the web server may be used. Since the transport layer connection has been established, the time to establish a transport layer connection is saved, thereby increasing the speed of the terminal to access the desired web site.

The embodiment shown in FIG. 3 may save the time to access a website, and occupy less network and system resources. When the network access point is switched to a proxy gateway, moreover, it may also save the time to access the proxy gateway.

Example IV

FIG. 4 shows an apparatus 400 for accessing a website. The apparatus 400 may be a device, such as a computer, a laptop, a tablet or a cell phone. The embodiment may not only save the time to access a website, but also occupy less network and system resources. The apparatus 400 may comprise an acquisition module 11 configured to acquire a condition met web address, a determination module 12 configured to determine a web server corresponding to the web address, an establishing module 13 configured to establish a transport layer connection with the web server, and a transmit module 14 configured to, upon receipt of an instruction to access a website corresponding to the web address, send a network request to the web server using the transport layer connection to acquire the webpage content of the website.

Functions of the apparatus 400 shown in FIG. 4 correspond to the functions implemented in Example I. Therefore, each module in this embodiment may be implemented with reference to Example I which will not be repeated one by one herein.

Example V

FIG. 5 shows another apparatus 500 for accessing a desired website. The apparatus 500 may be a device, such as a computer, a laptop, a tablet or a cell phone. The exemplary embodiment of the apparatus 500 may save the time to access the desired website, and occupy less network and system resources. When the network access point is switched to a proxy gateway, moreover, it may also save the time to access the proxy gateway. The apparatus 500 comprises a first deciding module 21 configured to determine if the network access point is switched to a proxy gateway, a first execution module 22 configured to, when the network access point is switched to a proxy gateway, establish a transport layer connection with the proxy gateway. Upon receipt of an instruction to access a desired website, the first execution module 22 is further configured to send a network request to the proxy gateway using the established transport layer connection with the proxy gateway to acquire the webpage content of the desired website. The apparatus 500 may further comprises an acquisition module 23 configured to acquire a condition met web address when the network access point is not switched to a proxy gateway, a determination module 24 configured to determine a web server corresponding to the web address, an establishing module 25 configured to establish a transport layer connection with the server, a transmit module 26 configured to, upon receipt of an instruction to access a desired website corresponding to the web address, send a network request to the server using the established transport layer connection to acquire the webpage content of the desired website.

Functions of the apparatus 500 shown in FIG. 5 correspond to the functions implemented in Example II. Therefore, each module in this embodiment may be implemented with reference to Example II which will not be repeated one by one herein.

Example VI

FIG. 6 shows another apparatus 600 for accessing a desired website. The apparatus 600 may be a device, such as a computer, a laptop, a tablet or a cell phone. The exemplary apparatus may save the time to access a website and occupy less network and system resources. When the compression-transfer setting is enabled on an intermediary, it may save the time to access the intermediary. The apparatus 600 may comprise a second deciding module 31 configured to determine whether the compression-transfer setting on the intermediary is enabled, a second execution module 32 configured to, when the compression-transfer setting on the intermediary is enabled, establish a transport layer connection with the intermediary. The second execution module 32 is further configured to, upon receipt of an instruction to access a desired website, send a network request to the intermediary using the established transport layer connection with the intermediary to acquire the webpage content of the desired website. The apparatus 600 may further comprise an acquisition module 33 configured to acquire a condition met web address when the network access point is not switched to a proxy gateway, a determination module 34 configured to determine a web server corresponding to the web address, an establishing module 35 configured to establish a transport layer connection with the server, a transmit module 36 configured to, upon receipt of an instruction to access a desired website corresponding to the web address. The transmit module 36 may be further configured to send a network request to the web server using the established transport layer connection to acquire the webpage content of the desired web site.

Functions of the apparatus 600 shown in FIG. 6 correspond to the functions implemented in Example III. Therefore, each module in this embodiment may be implemented with reference to Example III which will not be repeated one by one herein.

Application Example I

In the Application Example I, all of the scenarios are situations in which a terminal can directly access a web server of a desired web site without going through an intermediary or a proxy gateway. Several scenarios that can apply the solutions according to the present invention will be introduced below:

Scenario I: when a user starts a browser on a terminal, the terminal receives an instruction to start the browser. The terminal acquires the most frequent accessed web address of the website and last accessed web address. For instance, the most frequent accessed web address of the website is www.baidu.com and the last accessed web address is also www.baidu.com. When Baidu server is determined, a transport layer connection with the Baidu server is established. If the user opens the Baidu website on the terminal, the terminal sends a network request to the Baidu server using the established transport layer connection to acquire the webpage content of Baidu. When the terminal receives the webpage data of the Baidu website from the Baidu server, the terminal will perform operations of loading, parsing, setting and rendering on the webpage data of the Baidu website, which are ultimately displayed on the browser of the terminal.

In Scenario I, by establishing a transport layer connection with the Baidu server in advance, the terminal can rapidly access the Baidu server, thereby saving the time to access the Baidu website. If the website accessed by the user is not the last accessed website or not the most frequent accessed web address, the established transport layer connection will be disconnected.

Scenario II: a user has started a browser on a terminal. When the user clicks on a navigation logo or a webpage link, the web address of the navigation logo or the webpage link is immediately acquired when user's finger touches the screen. A transport layer connection with the web server is established. The finger may be in contact with touch screen for about 200 to 500 milliseconds. When the finger leaves the touch screen, the terminal sends a network request to the web server using the established transport layer connection to acquire the webpage content of the website. When the terminal receives the webpage data of the website from the web server, the terminal may perform operations of loading, parsing, setting and rendering on the webpage data of the website, which are ultimately displayed on the browser of the terminal.

In Scenario II, by establishing a transport layer connection, the terminal can rapidly access the server, thereby saving the time to access the website. If the finger is in contact with the touch screen for a period of time that meets a predefined long-press requirement a pop-up menu is needed for subsequent operation. No network request will be generated.

Scenario III: a user has started a browser on a terminal. When the user clicks on a functional interface, a web address of the website that was accessed the most recently and a web address of the website that is most frequently accessed in the functional interface are acquired. A transport layer connection with these web addresses is established. When the user opens a website corresponding to the above web addresses, the terminal sends a network request to the web server corresponding to the web address using the transport layer connection to acquire the webpage content of the website. When the terminal receives the webpage data of the website from the web server, the terminal will perform operations of loading, parsing, setting and rendering on the webpage data of the website, which are ultimately displayed on the browser of the terminal.

In Scenario III, by establishing a transport layer connection, the terminal can rapidly access the web server, thereby saving the time to access the website. The functional interface in this scenario may be a navigation, bookmark or application center. When the user does not open the webpage but exits the interface, or the user opens a webpage in the interface that is not the desired web addresses, the established transport layer connection will be disconnected.

Scenario IV: a user has started a browser on a terminal. When the user clicks on a web address input interface, top three web addresses being displayed in a web address matching list as well as a web address of the website that was accessed the most recently are acquired. A transport layer connection with these web addresses is established. When the user opens a website corresponding to the desired web addresses, the terminal sends a network request to the web server corresponding to the desired web address using the transport layer connection to acquire the webpage content of the website. When the terminal receives the webpage data of the website from the web server, the terminal will perform operations of loading, parsing, setting and rendering on the webpage data of the website, which are ultimately displayed on the browser of the terminal.

In Scenario IV, when the user does not open the webpage but exits the interface, or the webpage opened in the interface is not the above desired website, the established transport layer connection will be disconnected.

Scenario V: a user has started a browser on a terminal. When the user clicks on a search interface, web address of the selected search engine is acquired. A transport layer connection with the web address is established. When the user conduct search using the search engine, the terminal sends a network request to the web server corresponding to the search engine using the transport layer connection to acquire the webpage content of the website. When the terminal receives the webpage data of the website from the server, the terminal will perform operations of loading, parsing, setting and rendering on the webpage data of the website, which are ultimately displayed on the browser of the terminal.

In Scenario V, when the user switches the search engine, a transport layer connection is established with the new search engine in advance. When the user exits the search interface, or the selected search engine is not being used in the search interface, the transport layer connection will be disconnected.

Scenario VI: a user has started a browser on a terminal. When the user opens a website, all web addresses contained in webpages of the desired website are acquired. Web servers corresponding to these web addresses are acquired. A desired web server associated with the most web addresses is identified. Web address corresponding to the desired web server is acquired. A transport layer connection with the web address is established. When the user opens the website corresponding to the web server, the terminal sends a network request to the web server associated with the search engine using the transport layer connection to acquire the webpage content of the website. When the terminal receives the webpage data of the website from the web server, the terminal will perform operations of loading, parsing, setting and rendering on the webpage data of the website, which are ultimately displayed on the browser of the terminal.

In Scenario VI, when the user switches to other websites, or opens a web address that is not associated with the desired website, the transport layer connection may be disconnected in 2 minutes.

Application Example II

In the Application Example II, a terminal accesses a desired web server of a website through an intermediary or a proxy gateway. Two exemplary embodiments are introduced below:

Scenario I: a user switches the network access point to a proxy gateway when the user is using a terminal. A transport layer connection with the proxy gateway is established in advance. When the user accesses a website by a browser of the terminal, the terminal may send a network request to the proxy gateway using established transport layer connection to acquire webpage data of the website. The terminal may then perform operations of loading, parsing, setting and rendering, which can save the time for the client to access the website.

In Scenario I, when a transport layer connection with the proxy gateway is established, if the transport layer connection between the client and the proxy gateway is disconnected due to instable network or various reasons, the transport layer connection between the client and the proxy gateway is re-established. When the network access point is switched to a non-proxy gateway, the transport layer connection between the client and the proxy gateway is disconnected.

Scenario II: when a user enables the compression-transfer setting on the browser of the terminal, the terminal may establish a transport layer connection with the intermediary in advance. When the user uses the browser of the terminal to access a website, the terminal may send a network request to the intermediary using the established transport layer connection to acquire webpage data of the website, and then perform operations of loading, parsing, setting and rendering, which may save the time for the client to access the website.

In Scenario II, when a transport layer connection with the intermediary is established, if the transport layer connection between the client and the intermediary is disconnected due to instable network or various reasons, the transport layer connection between the client and the intermediary is re-established. When the compression-transfer setting is disabled, the transport layer connection between the client and the intermediary may be disconnected.

It should be noted that embodiments shown in FIG. 1 to FIG. 6 are only exemplary embodiments of the present invention. Typically, all steps of the methods according to the embodiments of the present invention are executed by the browser client at the terminal side, or may be executed by other application with webpage browsing capabilities at the terminal side. Those skilled in the art may design more embodiments which will not be repeated herein.

According to another aspect of the present invention, to keep authority control of a user access independent of business modules, and to improve the entire system's security and protect user information, fingerprint signature may be applied to a webpage being accessed by user. The fingerprint signature is generated using the URL of the webpage as well as the local cookie information of the webpage (which stores the user's fingerprint information). After the fingerprint signature is generated, URLs of all related webpages of the current website carry the user's fingerprint signature. The related webpages are webpages associated with the user who accesses the webpage. As a result, the URL of a related webpage is unique. When the webpage is accessed by a user again, the web serve performs a verification on the fingerprint signature to determine whether the user has the authority to access the webpage.

FIG. 7 is a flow chart of a method for authority control of a user access to a webpage according to an embodiment of the present invention.

As shown in FIG. 7, the method comprises:

S700: acquiring a user's local cookie information of a current website as well as original URLs of all related webpages of the current website in accordance with a first access request to access a webpage generated by the user.

According to the embodiment of the present invention, a user accesses a website and browses a webpage via a browser client. When the user sends the first access request to the web server, the browser client checks whether cookie information corresponding to the website is saved locally. If the browser client determines that cookie information of the current website is saved locally, it may automatically upload the cookie information to the web server when the first access request is generated. The cookie information (typically encrypted) may be saved on user's local terminal and used to identify user's identity and track session. Cookie information is set by the web server at the browser client when the user registers and logs on the website for the first time.

Related webpages may be defined as webpages having resources available to a particular user. For instance, when the current website is an e-Business website, related webpages are webpages of which have content information that is associated with the user. For example, pages that contain a list of products that the user purchased and made payments for, a list of products that the user selected but has not made payments for, user's payment account, and user's account balance. Namely, only registered user himself/herself has the authority to access related webpages.

It should be noted herein that acquiring a user's local cookie information is to acquire the user fingerprint information in the user's local cookie information. The user fingerprint information can identify the user's unique identity, which is typically saved in the user's local cookie information. Acquiring original URLs of all related webpages of the current website is to perform encryption to both the original URLs of all related webpages of the current website and the user's fingerprint information together.

S701: performing user fingerprint signature in accordance with the user's local cookie information of the current website as well as the original URLs of all related webpages of the current website, and generating encrypted URLs of all related webpages of the current website. The encrypted URLs carry user fingerprint signature.

Step S701 may further comprise extracting user fingerprint information from the user's local cookie information, acquiring original URLs of all related webpages of the current website, performing encryption based upon the user fingerprint information as well as the original URLs of all related webpages, generating ciphertexts for each of the original URLs of all related webpages, and embedding the ciphertexts into each of the original URLs of all related webpages. The ciphertexts are the user fingerprint signature or information that contains the user fingerprint signature, which is usually a character string, e.g. "40837a8d5df24b799ba4997d1c84d6db" or "79assfh".

Any existing encryption algorithm may be used to perform the encryption. For example, the encryption may be performed using MD5 algorithm. In other words, when user accesses aa.com/1.html, MD5 algorithm may be used to perform encryption. The encrypted user fingerprint information may be 79assfh. The above description is an example of encryption, and the encryption algorithms described herein are not limited thereto.

S702: returning desired information. The desired information may comprise the encrypted URLs of all related webpages as well as the content information of the website page corresponding to the first access request. According to an embodiment of the present invention, the web server may return the desired information to the browser client for display.

To control the access to the webpage, because the URL of related webpages are encrypted based upon the user fingerprint information, a user cannot manually modify the webpage links.

FIG. 8 is a flow chart of a method for authority control of a user access to a webpage according to another embodiment of the present invention. Steps S800 to S802 are the same as the above steps S700 to S702 shown in FIG. 7, the difference between the methods illustrated in FIG. 7 and FIG. 8 is that, after returning the desired information, the method in FIG. 8 may further comprise the following steps:

S803: receiving a second access request to access a related webpage of the current website, the related webpage is associated with an encrypted URL which carries a user fingerprint signature.

In an embodiment of the present invention, when a user is browsing a business website on the browser client and needs to further browse the webpage resources of the current web site that belong to the user, the user clicks on the encrypted URL displayed on the webpage. The click operation may generate a second access request. The second access request is sent to the web server.

5804: performing a user fingerprint verification in response to the second access request.

In an embodiment of the present invention, the step of performing user fingerprint verification further comprises: extracting the original URL of the desired webpage specified in the second access request from the URLs of related webpages, extracting user fingerprint information from the user's local cookie information uploaded along with the second access request, performing encryption based upon the original URL of the desired webpage and the user fingerprint information, and generating a verification ciphertext in response to the second access request. If the verification ciphertext is consistent with the ciphertext carried by the second access request, it is determined that the user who issued the second access request has the access authority. Otherwise, it is determined that the user who issued the second access request does not have the access authority. An allowable access authority may be provided for user. It should be noted that the encryption method in this step is consistent with the encryption method in the step S801 or employs the same algorithm. For example, encryption may be performed by using MD5 algorithm. When the user accesses aa.com/79assfh/1.html, the original URL of aa.com/1.html is extracted and MD5 algorithm is used for encryption. A verification ciphertext 79assfh is obtained which is consistent with the ciphertext carried in the URL aa.com/79assfh/1.html clicked by the user, indicating that the user is accessing an encrypted URL that is returned by the web server. In this manner, it is determined that the user has the access authority. Encryption method and authority control method are not limited to this embodiment.

When a user is viewing his/her own webpage resources, the web system does not need to additionally determine whether the webpage resources belong to this user. User fingerprint verification can be performed while opening the webpage resources by clicking on the encrypted URLs returned by the web server, which reduces the conflict between authority control for a user access and business logic. Therefore, the authority control is independent from a website's business modules. Authority control of user access to webpage resources are central-controlled.

In another example according to the present invention, if the user fingerprint verification fails due to abnormal local cookie information, the web server will jump to the account login page and provide the account login page to the browser client in response to the second access request to the encrypted URL. When the user re-types the user name and password and successfully logs in, the user fingerprint verification will be performed again on the encrypted URL.

Since each user fingerprint is unique, the encrypted URL is unique as well. To perform fingerprint verification on the encrypted URL, the ciphertext generated by encrypting the URL of the related webpage is compared with the user's local cookie information. The comparison result may determine whether the user has the authority to access the webpage without enabling the web server to check database to determine the ownership of the webpage resource.

According to embodiments of the present invention, therefore, on one hand, the encrypted URL of related webpages are associated with the user fingerprint information, such that a user cannot manually modify the webpage links. On the other hand, absence of checking database by the web server, SQL injection security vulnerability is avoided, which improves the efficiency of the web server.

The present invention further provides an apparatus for authority control of user access to a webpage. FIG. 9 shows a block diagram of an apparatus 900 for authority control according to an embodiment of the present invention. The apparatus 900 comprises a user information acquisition module 901 configured to acquire a user's local cookie information of a current web site and original URLs of all related webpages in response to a first access request, a user fingerprint signature generation module 902 configured to generate encrypted URLs of all related webpages in accordance with the user's local cookie information and original URLs of all related webpages of the current website, a webpage content information return module 903 configured to return the encrypted URLs of all related webpages along with the content information of the web page to which the first access request is sent, a user fingerprint verification module 904 configured to perform user fingerprint verification on the encrypted URL of the webpage to which the second access request is sent.

FIG. 10 is a block diagram of a server 1000 for authority control of user access to a webpage according to another embodiment of the present invention. The server 1000 comprises the apparatus 900 shown in FIG. 9.

The apparatus 900 may be implemented at the web server. The apparatus 900 installed at the web server which may reduce additional burden on operations and data processing at client side.

FIG. 11 is a block diagram of an apparatus 1100 for authority control of user access to a webpage according to another embodiment of the present invention. The apparatus 1100 may comprise a first access request transmit and cookie information upload module 1101, configured to send a first access request to a web page and upload a user's local cookie information of a current web site, a webpage content information receive module 1102 configured to receive encrypted URLs of all related webpages of the current web site as well as the content information of the web page to which the first access request is sent, and receive the content information of the web page to which the second access request is sent, a second access request generate and transmit module 1103 configured to receive a signal generated by user's click on an encrypted URL and generate a second access request to access a webpage associated with the encrypted URL.

In one example of the present invention, the apparatus 1100 is implemented in the browser client on a mobile terminal, such as a cell phone.

In the method, apparatus and server for authority control of user access according to embodiments of the present invention, a web server generates encrypted URLs of all related webpages by performing fingerprint signature on URLs of the related webpages as well as the user's local cookie information. The encrypted URLs are unique. For subsequent access to the encrypted URLs, the web server may verify whether the encrypted URL is consistent with the local cookie information, thereby determining whether the user has the authority to access the desired webpage without enabling the web server to check database to determine the ownership of the webpage resource. As a result, the conflict between authority control for a user access and business logic is reduced. SQL injection security vulnerability is avoided, making it impossible for hackers to launch malicious attacks against the website by making modifications to the webpage URL. Work efficiency of the web server may be improved. Moreover, it improves the entire system's security class and protects user information.

The method of authority control is illustrated in detail according to exemplary embodiment of the present invention.

(1) User A types an original URL https://gcmall.uc.cn/goodslist/?goodsId=123. The browser client acquires user A's local cookie information related to the typed original URL, and sends user A's request to access the webpage associated with the typed original URL and the local cookie information.

(2) The web server retrieves from the access request the user fingerprint information in the local cookie information. The access request is uploaded by the browser client. An encryption is performed on the typed URL and the user fingerprint information to generate a ciphertext "40837a8d5df24b799ba4997d1c84d6db." The ciphertext is embedded into a new related webpage to generate an encrypted URL. Namely, the ciphertext "40837a8d5df24b799ba4997d1c84d6db" is added to the typed original URL https://gcmall.uc.cn/goodslist/?goodsId=123 to generate the encrypted URL https://gcmall.uc.cn/goodslist/40837a8d5df24b799ba4997d1c84d6db/?goodsId=123. The web server returns to the browser client the encrypted URL along with the content information of the desired web page to which the first access request is sent.

(3) When the user opens the webpage using the encrypted URL at the browser client, user fingerprint verification is performed on the encrypted URL. In other words, the original URL is extracted from the encrypted URL and user fingerprint information is extracted from the user's local cookie information which is uploaded along with the request to access the encrypted URL https://gcmall.uc.cn/goodslist/40837a8d5df24b799ba4997d1c84d6db/?goodsId=123. Encryption is then performed based upon the original URL and user fingerprint information to generate a verification ciphertext corresponding to the access request. If the verification ciphertext is consistent with the ciphertext carried by the access request to URL https://gcmall.uc.cn/goodslist/40837a8d5df24b799ba4997d1c84d6db/?goodsId=123, it is determined that the access request has the access authority. Otherwise, the access request does not have the access authority. A corresponding access authority is provided.

When user A regularly requests an access to the webpage, the webpage URL is https://gcmall.uc.cn/goodslist/40837a8d5df24b799ba4997d1c84d6db/?goodsId=123. If user A maliciously makes changes the webpage URL to https://gcmall.uc.cn/goodslist/40837a8d5df24b799ba4997d1c84d6db/?goodsId=321, because the ciphertexts carried by the changed URL is different than the verification ciphertexts, user A is unable to access the network resources using the changed URL. As a result, the user information is protected.

It can be seen from the description of the above embodiment that, an encrypted URL is generated based upon a web address being accessed by a user as well as the local cookie information carrying the user fingerprint information. When the user subsequently accesses the web address again, the web server may determine if the user has the authority to access the webpage by verifying whether the web address is consistent with the local cookie information. By means of such an encryption method, a user's access authority is determined based on the user fingerprint information carried by the URL without enabling the web server to check database to determine the ownership of the webpage resource.

Those skilled in the art should understand that units and algorithm of each examples disclosed herein can be implemented by hardware or combinations of software program and hardware. Whether such functions are implemented by software or hardware depends on specific applications and design conditions. Many modifications and other example embodiments set forth herein will come to mind to one skilled in the art to which these example embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

It should be understood that the system, apparatus and method may be implemented in other manners. For example, the above-described apparatus embodiments are only exemplary, for example, the division of units is only a division of logic functions, and other ways of division may exist in actual implementation. For example, a plurality of units or components may be combined or integrated into another system, or some features may be omitted or not executed. Another point is that the displayed or discussed mutual coupling or direct coupling or communication connection may be indirect coupling or communication connection through some ports, apparatuses or units, and may be in electrical, mechanical or other forms.

Units that are described as discrete parts may or may not be physically separated, parts displayed as units may or may not be physical units, namely, may be installed at one location, or distributed on a plurality of network units. Some or all of the units may be selected according to actual need to attain the object of the solutions of the embodiments.

In addition, all function units in all embodiments of the present invention may be integrated into one processing unit, or the units may exist as physical individuals, or two or more units may be integrated into one unit.

When a function is implemented in the form of a software function unit and sold or used as an independent product, it can be stored in a computer readable storage medium. Based on such a understanding, the technical solution of the present invention in essence, or a part that contributes to the prior art or a part of the technical solution may be embodied in the form of a software product, said computer software product is stored in a storage medium, comprising a number of instructions to cause a computer device (which may be a personal computer, a server or a network device) or a processor to execute all or some steps of the method according to each embodiment of the present invention. The above-mentioned storage medium comprises a variety of media that can store program codes, such as flash drive, portable hard drive, ROM (Read-Only Memory), RAM (Random Access Memory), magnetic disk or CD.

Only specific embodiments of the present invention are described above, but the scope of the present invention is not limited thereto. Any variations or substitutions that can be easily thought of by those skilled in the art within the technical scope disclosed by the present invention shall be encompassed by the present invention.

That which is claimed:

1. A method comprising:
    acquiring, by a terminal comprising at least one processor, a web address in a preset interface that meets a preset condition in response to receiving, by the terminal, an instruction for entering the preset interface of a browser on the terminal;
    determining, by the terminal, a server corresponding to the web address in the preset interface that meets the preset condition;
    establishing, by the terminal, a transport layer connection with the server prior to accessing a website corresponding to the web address in the preset interface;
    using, by the terminal, the established transport layer connection to send a network request to the server for acquiring the webpage content of the website in response to receiving, by the terminal, an instruction for performing an action associated with the preset interface;
    displaying, by the terminal, the webpage content of the website on the browser of the terminal;
    disconnecting the established transport layer connection between the terminal and the server in response to receiving, by the terminal, an instruction for exiting the web address in the preset interface that meets the preset condition;
    determining whether a network access point is switched to a proxy gateway; and
    in an instance in which the network access point is switched to the proxy gateway, establish the transport layer connection with the proxy gateway.

2. The method according to claim 1, wherein, prior to the acquiring the web address that meets the preset condition, the method further comprises:
    turning on a compression transfer function of an intermediary; and
    establishing a transport layer connection with the intermediary.

3. The method according to claim 2, further comprises:
    using, by the terminal, the established transport layer connection to send a network request to the intermediary for acquiring the webpage content of the website;
    receiving, from the intermediary, a compressed webpage content turning on a compression transfer function of an intermediary; and
    displaying, by the terminal, the compressed webpage content of the website on the browser of the terminal.

4. The method according to claim 2, further comprises:
    disconnecting the established transport layer connection between the terminal and the intermediary in response to disabling the compression transfer function.

5. The method according to claim 1, wherein the acquiring the web address that meets the preset condition comprises:
    upon receiving an instruction for clicking a website link, acquiring a web address of the website link;
    upon receiving an instruction for entering a target website, acquiring a web address of a website link that meets a preset condition in the target website; and
    when a current input box receives a web address inputted by a user, acquiring the web address inputted by the user.

6. The method according to claim 1, wherein acquiring the web address in the preset interface that meets the preset condition corresponding to a functional interface comprises acquiring a web address of a website that was accessed most recently and acquiring a web address of a website that was accessed most frequently and establishing, by the terminal, the transport layer connection with the web address of the website that was accessed most recently and the web address of the website that was accessed most frequently.

7. The method according to claim 1, wherein acquiring the web address in the preset interface that meets the preset condition corresponding to a web address input interface comprises acquiring a predetermined amount of web addresses displayed in a web address matching list and acquiring a web address of a website that was accessed most recently; and establishing, by the terminal, the transport layer connection with the predetermined amount of web addresses in the matching list and the web address of the website that was accessed most recently.

8. The method according to claim 1, wherein acquiring the web address in the preset interface that meets the preset condition corresponding to a search interface comprises acquiring a web address of a selected search engine and establishing, by the terminal, the transport layer connection with the web address of the selected search engine.

9. An apparatus comprising at least one processor and at least one non-transitory computer readable medium including computer program code, the at least one non-transitory computer readable medium and the computer program code configured to, with the at least one processor, cause the apparatus to at least:
    acquire a web address in a preset interface that meets a preset condition in response to receiving an instruction for entering the preset interface of a browser on the apparatus;
    determine a server corresponding to the web address in the preset interface that meets the preset condition;
    establish a transport layer connection with the server prior to accessing a website corresponding to the web address in the preset interface;
    use the established transport layer connection to send a network request to the server for acquiring the webpage content of the website in response to receiving an instruction for performing an action associated with the preset interface;
    display the webpage content of the website on the browser of the apparatus;
    disconnect the established transport layer connection between the apparatus and the server in response to receiving an instruction for exiting the web address in the preset interface that meets the preset condition;
    determine whether a network access point is switched to a proxy gateway; and
    in an instance in which the network access point is switched to the proxy gateway, establish the transport layer connection with the proxy gateway.

10. The apparatus according to claim 9, wherein the at least one non-transitory computer readable medium and the computer program code are further configured to, with the at least one processor, cause the apparatus to at least:
    determine if a compression transfer function of an intermediary is turned on; and when the compression transfer function of the intermediary is turned on, establish a transport layer connection with the intermediary.

11. A computer program product comprising at least one non-transitory computer readable medium having a processor executable program code stored therein, wherein, the program code is configured to when executed by the at least one processor, cause the at least one processor to:

acquire a web address in a preset interface that meets a preset condition in response to receiving, by a terminal, an instruction for entering the preset interface of a browser on the terminal;

determine a server corresponding to the web address in the preset interface that meets the preset condition;

establish a transport layer connection with the server prior to accessing a website corresponding to the web address in the preset interface;

use the established transport layer connection to send a network request to the server for acquiring the webpage content of the website in response to receiving an instruction for performing an action associated with the preset interface;

cause to display the webpage content of the website on the browser of the terminal;

disconnect the established transport layer connection between the terminal and the server in response to receiving an instruction for exiting the web address in the preset interface that meets the preset condition;

determine whether a network access point is switched to a proxy gateway; and in an instance in which the network access point is switched to the proxy gateway, establish the transport layer connection with the proxy gateway.

* * * * *

UNITED STATES PATENT AND TRADEMARK OFFICE
CERTIFICATE OF CORRECTION

| | |
|---|---|
| PATENT NO. | : 11,128,621 B2 |
| APPLICATION NO. | : 15/934021 |
| DATED | : September 21, 2021 |
| INVENTOR(S) | : Jie Liang |

It is certified that error appears in the above-identified patent and that said Letters Patent is hereby corrected as shown below:

On the Title Page

Item (73) Assignee: "Alibaba Group Holdings Limited, George Town (KY)" should read --Alibaba Group Holding Limited, George Town (KY)--

Signed and Sealed this
Twentieth Day of September, 2022

*Katherine Kelly Vidal*

Katherine Kelly Vidal
*Director of the United States Patent and Trademark Office*